# 2,787,637

PURIFICATION OF DEHYDROABIETYLAMINE

Lee C. Cheney, Fayetteville, N. Y., assignor to Bristol Laboratories Inc., Syracuse, N. Y., a corporation of New York No Drawing. Application January 28, 1953, Serial No. 333,817

2 Claims. (Cl. 260—501)

This invention relates to dehydroabietylamine. More particularly, it relates to a process of preparing purified dehydroabietylamine acetate and to the product obtained.

This purified dehydroabietylamine acetate has novel utility in processes for the recovery of penicillin. It is also useful in preparation of a dehydroabietylamine benzylpenicillin which is sufficiently purified to be relatively stable to the steam used in the pelletizing of pig and chicken feeds. The purified dehydroabietylamine and its salts of this invention are useful as intermediates for the preparation of other organic compounds for therapeutic purposes, particularly where pure products of known and certain composition are preferred.

The compound prepared by the process of my invention has the formula

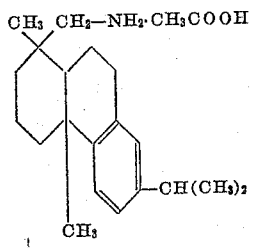

and begins to melt only above 140° C. Because of its commercial availability the composition of amines which I prefer to use as a reagent in the process of the present invention is "Rosin Amine D" manufactured by Hercules Powder Company, Wilmington, Delaware. "Rosin Amine D" consists of approximately 50% dehydroabietylamine, 20% dihydroabietylamine, and 20% tetrahydroabietylamine, the remainder comprising neutral materials of rosin. Further description of these materials is found in my U. S. Patent #2,585,436, issued February 12, 1952.

I have discovered, according to the present invention, the process of reacting a mixture containing dehydroabietylamine, dihydroabietylamine and tetrahydroabietylamine with about one equivalent of acetic acid in toluene and separating from this reaction mixture crystalline dehydroabietylamine acetate which does not begin to melt below 140° C. and which is substantially free of the acetates of dihydroabietylamine and tetrahydroabietylamine.

The value of non-toxic salts of penicillin as supplements in poultry and livestock feeds is well established. It is also known (see B. H. Schneider and H. H. Brigman, The State College of Washington, Institute of Agricultural Sciences, Stations Circular No. 115, September 1950) that pelleted feeds, as compared to the same feeds ground and unpelleted, give greater gains in weight per pound of feed in chickens and pigs. As reported by M. M. Nixon (Feedstuffs, volume 22, page 67, December 9, 1950), in pelletizing chick or laying mashes, it is necessary to add steam at from 60 to 90 lbs. pressure to the feed in order to pelletize satisfactorily. Some formulae containing soybean oil meal may require water as well as steam.

This use of steam under pressure in pelletizing feeds containing supplementary salts of penicillin has been found to be highly detrimental to the stability of salts of penicillin. The discovery that dehydroabietylamine penicillin which does not begin to melt below 164° C. is relatively stable in such pelletized feeds has therefore provided a poultry and livestock feed of high utility and made possible the incorporation therein of penicillin in a form which is stable and maintains its potency for reasonable periods of time despite exposure to steam in the commercial pelletizing process.

The invention is illustrated by the following examples but it is to be understood that these examples are given by way of illustration and not of limitation.

EXAMPLE I

Rosin Amine D (Hercules, 496 g., about 1.73 equivalents) is dissolved in toluene (785 ml.). This mixture is heated to 80° C. on the steam bath and there is then added slowly with stirring 108 g. (1.8 equivalents) of glacial acetic acid in 260 ml. of toluene. Crystalline dehydroabietylamine acetate precipitates on cooling and is collected by filtration and washed with toluene (about 700 ml.) until the salt is white. The salt melts at about 141°–143.5° C.

This salt is characterized by greater than 95 mole percent purity and is substantially free of acetates of dihydroabietylamine and tetrahydroabietylamine.

EXAMPLE II

Potassium penicillin G (175.2 g., 0.47 mole) is dissolved in 434 ml. of water and the solution is diluted with 3.5 liters of methanol and placed in an ice bath. Dehydroabietylamine acetate (167 g., 0.48 mole) prepared according to Example I above is dissolved first in 745 ml. of methanol with slight warming, diluted with 561 ml. of water and the solution is added dropwise over 30 minutes to the solution of potassium penicillin. After cooling, the crystalline dehydroabietylamine benzylpenicillin is collected by filtration, air-dried and found to melt at 166°–168° C. The salt is soluble in water at room temperature to the extent of less than 200 units/ml.

EXAMPLE III

Dehydroabietylamine acetate (51.1 g.) prepared as in Example I is recrystallized from toluene (210 ml.) and found to melt at about 143°–146° C. Recrystallized salt (42.5 g.) is recrystallized from 320 ml. of ethyl acetate and found to melt at about 143°–146° C. Dehydroabietylamine acetate thus purified (27.4 g., 0.079 mole) is dissolved in a mixture of 184 ml. methanol and 140.2 ml. of water is added to a cold (10° C.) solution of 28.8 g. (0.0773 mole) of potassium penicillin G in a mixture of 71.4 ml. of water and 580 ml. of methanol. After cooling, the crystalline dehydroabietylamine benzylpenicillin is collected by filtration, dried and found to melt at about 166°–168° C. Upon drying in high vacuum over $P_2O_5$ this salt lost 0.89% water at room temperature and 2.28% water at 80° C. and may thus be the monohydrate (theory: 2.8% water).

An aqueous suspension containing at least 50,000 units per cc. of this salt is stable at 72° F. for at least one year. This suspension provides effective blood levels of penicillin in oral therapeutic use.

This salt is characterized by greater than 95 mole percent purity and is substantially free of penicillin salts of dihydroabietylamine and tetrahydroabietylamine.

EXAMPLE IV

It was not found possible to prepare dehydroabietylamine acetate of satisfactory purity by replacing toluene with xylene, ethylene dichloride, chlorobenzene, benzene, n-butanol, methyl isobutyl ketone, cyclohexane, acetone, methylcyclohexane, cyclohexanone, methyl ethyl ketone or mesityl oxide respectively in the procedure of Example I.

EXAMPLE V

For growing, fattening pigs, an effective feed which may be pelletized without substantial loss of penicillin, either immediately or upon subsequent storage, is obtained by the addition of about one to ten parts by weight of dehydroabietylamine benzylpenicillin prepared as in Example II above to 100,000 parts by weight of a formula consisting of barley 57%, peas 26.5%, alfalfa 10%, meat meal 5%, iodized salt 0.5%, bone meal 0.5% and ground limestone 0.5%. Other equally useful formulae, e. g. GLF chicken feed, are well known to those skilled in the art and may be used in like fashion with the dehydroabietylamine penicillin of Example II above.

EXAMPLE VI

The dehydroabietylamine acetate prepared in Example I is dissolved in water to make a concentrated solution. Upon the addition of sodium hydroxide, an oil or solid separates which is removed, dried over solid potassium hydroxide, drained therefrom and cooled to yield crystalline dehydroabietylamine, M. P. 42.5°–45° C. The free base is then converted to other acid addition salts by reaction in the usual manner with such acids as sulfuric, citric, maleic, phosphoric, sulfamic, tartaric, hydrobromic, malic, succinic, glycolic and the like.

EXAMPLE VII

Dehydroabietylamine acetate (25 g.) prepared in Example I is dissolved in 50 ml. warm water. To this solution 40 ml. of 10% NaOH is added. The free amine is extracted with 200 ml. ether and dried by azeotropic distillation of water with benzene (25 ml.) after removal of the ether by distillation. There remains behind after removal of the solvents the free base dehydroabietylamine which solidifies on cooling to 10°–15° C. and melts at about 40°–41° C., boils at about 192°–193°/1 mm. and has $n_D^{33}$ 1.5480.

EXAMPLE VIII

Dehydroabietylamine acetate (17.27 g.; 0.05 mole) prepared in Example I is dissolved in 150 ml. water. Nitric acid (3.22 g.; 0.051 mole) is diluted with 50 ml. of water and added. Crystalline dehydroabietylamine nitrate precipitates and is found to melt at about 180°–181° C.

*Analysis.*—Calculated for $C_{20}H_{32}N_2O_3$:

|   | Calculated | Found |
|---|---|---|
| C | 69.4 | 69.4 |
| H | 9.26 | 9.44 |

EXAMPLE IX

Dehydroabietylamine picrate is prepared in 200 ml. methanol from dehydroabietylamine (11.1 g.) and picric acid (9.1 g.). The product precipitates, is collected by filtration, recrystallized from aqueous methanol and is found to melt at about 234°–236° C.

*Analysis.*—Calculated for $C_{26}H_{34}N_4O_3$:

|   | Calculated | Found |
|---|---|---|
| C | 60.9 | 60.8 |
| H | 6.67 | 6.92 |

EXAMPLE X

I. *Separation of dehydroabietylamine acetate from Rosin Amine D*

A 2.85-kg. sample of Rosin Amine D (Hercules Powder Company) is dissolved in 4.74 liters of toluene by heating the stirred mixture on a steam-bath until all of the viscous amine is dissolved and the temperature is about 65° C. Into this solution is added slowly and cautiously a solution prepared from 654 g. (10.8 moles) of glacial acetic acid and 1.56 liters of toluene. Heating the amine solution before the addition of the acetic acid prevents the acetate from crystallizing during this neutralization, which is exothermic. Rapid addition of acid, or excessive cooling, therefore, should be avoided. At the end of the addition, the stirred acidic solution (temperature about 82° C.) is cooled in an ice-bath to 15° C. or lower. After all of the acid has been added make certain that the hot solution is definitely acidic to moist universal test paper. Free ammonia is known to be present in "Rosin Amine D." For this reason, it may be necessary to add additional acetic acid before cooling the solution.

The acetate crystallizes slowly and upon complete crystallization it is filtered by suction and sucked on the filter as free of solvent as practical. Before discarding the filtrate, a sample should be cooled further and also treated with additional acetic acid to make certain precipitation is complete.

This crystalline, somewhat yellow dehydroabietylamine acetate is transferred directly to a twelve-liter vessel and covered with 4.6 liters of toluene. The acetate is completely dissolved by heating the mixture to about 80° C. The solution is then cooled below 15° C. to complete the recrystallization. The acetate is collected by suction filtration and washed while on the filter with 4.23 liters of toluene. At this point the cake of acetate should be snow-white and free of deleterious impurities. Recrystallization and thorough washing are essential for the removal of residual inert rosin impurities, dihydroabietylamine acetate and tetrahydroabietylamine acetate which are all quite soluble in toluene. The crystalline dehydroabietylamine is sucked as dry as possible on the filter and then washed with approximately 2.5 liters of Skellysolve A to wash out residual toluene and thus to facilitate drying. After being dried to constant weight, the salt melts within the range of 140°–145° C. and weighs about 1.365 kg. (about 78.5% of the theoretical yield. Approximately 50% of Rosin Amine D is dehydroabietylamine, $C_{20}H_{31}N$, of molecular weight 285.46. The theoretical yield of the acetate (mol. wt. 347.5) is therefore five moles (1.735 kg.).

II. *Preparation of crystalline dehydroabietylamine penicillin*

Separate solutions are made up for the dehydroabietylamine acetate and the potassium benzylpenicillin as follows:

The acetate solution (A) is prepared by dissolving 1.365 kg. (3.95 moles) of dehydroabietylamine acetate in 6.10 liters of methanol and 4.58 liters of water. If the resulting solution is turbid and/or alkaline to universal indicator paper, acetic acid is added until the solution is clear and definitely acidic. Otherwise, the presence of insoluble free amine may impede crystallization of the penicillin salt. The clear, acidic solution (A) of the amine acetate is filtered to remove impurities.

The penicillin solution (B) is prepared by dissolving 1.314 kg. (3.53 moles) of potassium benzylpenicillin in 3.60 liters of water followed by the addition of 29 liters of methanol.

The acetate solution (A) is added dropwise to the chilled (10°–15° C. or lower) penicillin solution (B) over a period of one hour or longer. Throughout this time solution B is gently stirred while being cooled in an ice-bath. Seeding the mixture during this addition initiates the formation of well defined crystals.

Upon complete addition of solution A to solution B, the penicillin salt is collected by suction filtration and washed thoroughly with the mother liquor. After sucking the cake as dry as possible, it is washed with a cold solution prepared by mixing 4 liters of methanol with 4 liters of distilled water. As much wash solvent as possible is removed by suction. The cake is spread out in trays and dried to constant weight in air or in an oven with good circulation of air. The drying temperature should not exceed 45° C. The salt is assigned the hemihydrate composition on the basis of analytical reports. The anhydrous salt absorbed water from the air to the extent of 1.25% of its dry weight (7.75 g. per mole). Evidence that the amine isolated is essentially pure dehydroabietylamine is based on ultraviolet absorption spectra, carbon-hydrogen analysis, stoichiometrical considerations, melting point and solubility studies on the acetates derived from "Rosin Amine S." The latter is known to contain 70-75% of the saturated tetrahydroabietylamine. The yield of white crystalline salt, M. P. 166°–168° C. (decompn.) is about 2.11 kg., which is about 95% of the theoretical amount (2.22 kg.).

While particular mention has been made above of the purified dehydroabietylamine benzylpenicillin, it will be understood that purified dehydroabietylamine salts of other penicillins are also included within the scope of this invention. For instance, penicillins such as penicillin G, F, X, O, dihydro F and K and mixtures of two or more such penicillins, particularly such mixtures containing at least 85% benzylpenicillin (penicillin G) are included within the scope of this invention.

The insolubility in water of dehydroabietylamine benzylpenicillin of this invention makes it of particular value for use as a penicillin precipitant.

The free amino group of the dehydroabietylamine of this invention makes this compound valuable for use as a chemical intermediate, particularly for the synthesis of pharmacological agents such as local anesthetics, antispasmodics, anti-gastric secretory agents, sedatives and depressants of the central nervous system.

I claim:

1. The process of reacting a mixture containing dehydroabietylamine, dihydroabietylamine and tetrahydroabietylamine with about one equivalent of acetic acid in toluene and separating from this reaction mixture crystalline dehydroabietylamine acetate which begins to melt above 139° C. and which is substantially free of the acetates of dihydroabietylamine and tetrahydroabietylamine.

2. The process of reacting a mixture containing dehydroabietylamine, dihydroabietylamine and tetrahydroabietylamine with about one equivalent of acetic acid in toluene, separating crystalline dehydroabietylamine acetate, adding alkali to this salt to liberate the free base and collecting dehydroabietylamine which is substantially free of dihydroabietylamine and tetrahydroabietylamine.

References Cited in the file of this patent

UNITED STATES PATENTS

| | | |
|---|---|---|
| 2,484,010 | Bried | Oct. 11, 1949 |
| 2,485,136 | Bried | Oct. 18, 1949 |
| 2,490,924 | Schertz | Dec. 13, 1949 |
| 2,490,925 | Schertz | Dec. 13, 1949 |
| 2,520,901 | Benoit | Sept. 5, 1950 |
| 2,580,496 | Zeiss | Jan. 1, 1952 |
| 2,585,436 | Cheney | Feb. 12, 1952 |

OTHER REFERENCES

Borglin: "Soap and Sanitary Chem.," December 1947, pp. 149, 167.